(12) United States Patent
Hasegawa et al.

(10) Patent No.: US 10,665,850 B2
(45) Date of Patent: May 26, 2020

(54) STACKED BATTERY

(71) Applicant: TOYOTA JIDOSHA KABUSHIKI KAISHA, Toyota-shi, Aichi-ken (JP)

(72) Inventors: Hajime Hasegawa, Susono (JP); Yuki Matsushita, Atsugi (JP); Mitsuru Tateishi, Susono (JP); Hideyo Ebisuzaki, Toyota (JP); Hideaki Nishimura, Sunto-gun (JP); Yusuke Okuhata, Susono (JP); Shigenori Hama, Sunto-gun (JP); Norihiro Ose, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 183 days.

(21) Appl. No.: 15/941,116

(22) Filed: Mar. 30, 2018

(65) Prior Publication Data

US 2018/0294471 A1 Oct. 11, 2018

(30) Foreign Application Priority Data

Apr. 7, 2017 (JP) ................................ 2017-076986

(51) Int. Cl.
*H01M 2/34* (2006.01)
*H01M 10/0525* (2010.01)
(Continued)

(52) U.S. Cl.
CPC ......... *H01M 2/34* (2013.01); *H01M 10/0413* (2013.01); *H01M 10/0525* (2013.01); *H01M 10/0585* (2013.01); *H01M 10/0562* (2013.01); *H01M 2200/00* (2013.01); *H01M 2200/103* (2013.01); *H01M 2200/106* (2013.01); *H01M 2220/20* (2013.01); *H01M 2300/0068* (2013.01)

(58) Field of Classification Search
CPC ......... H01M 10/0413; H01M 10/0525; H01M 10/0562; H01M 10/0585; H01M 2200/00; H01M 2200/103; H01M 2200/106; H01M 2220/20; H01M 2300/0068; H01M 2/34
See application file for complete search history.

(56) References Cited

U.S. PATENT DOCUMENTS

2013/0065097 A1 3/2013 Hosaka et al.

FOREIGN PATENT DOCUMENTS

| EP | 1636870 A1 | 3/2006 |
| EP | 2 573 839 A1 | 3/2013 |

(Continued)

*Primary Examiner* — Carlos Barcena
(74) *Attorney, Agent, or Firm* — Sughrue Mion, PLLC

(57) ABSTRACT

Disclosed is a stacked battery including at least one short-circuit current shunt part and electric elements, wherein: the shunt part includes first and second current collector layers, and an insulating layer provided between the first and second current collector layers, all of these layers being stacked; each power generation element includes a cathode current collector layer, a cathode material layer, an electrolyte layer, an anode material layer, and an anode current collector layer all of these layers being stacked; the first current collector layer is electrically connected to the cathode current collector layer and the second current collector layer to the anode current collector layer; the electric elements are electrically connected in parallel; and the shunt part next to the electric elements includes a PPTC layer between the first current collector layer and the insulating layer and/or between the second current collector layer and the insulating layer.

4 Claims, 7 Drawing Sheets

(51) Int. Cl.
*H01M 10/0585* (2010.01)
*H01M 10/04* (2006.01)
*H01M 10/0562* (2010.01)

(56) References Cited

FOREIGN PATENT DOCUMENTS

| | | |
|---|---|---|
| JP | 7-220755 A | 8/1995 |
| JP | 2001-068156 A | 3/2001 |
| JP | 2001-068157 A | 3/2001 |
| JP | 5477467 B2 | 4/2014 |
| JP | 2015-018710 A | 1/2015 |
| JP | 2017-50241 A | 3/2017 |

STACKED BATTERY

FIELD

The present application discloses a stacked battery in which a plurality of electric elements are stacked.

BACKGROUND

Patent Literature 1 discloses a stacked polymer electrolyte battery including an electrode group and short-circuiting and a heat radiation accelerating units. The units are formed by arranging two metal plates outside the electrode group each via an insulator. The battery of Patent Literature 1 is thought to be able to reduce the voltage across its electric element and to smoothly release heat generated in the unit etc. to the outside when the electrodes are short-circuited by nailing etc., by an application of a short-circuit current to the short-circuiting and heat radiation accelerating unit. Patent Literatures 2 and 3 also disclose various techniques to inhibit heat generation due to internal short circuit of batteries occurred by nailing etc.

CITATION LIST

Patent Literature

Patent Literature 1: JP2001-068156 A
Patent Literature 2: 2001-068157 A
Patent Literature 3: 2015-018710 A

SUMMARY

Technical Problem

In a stacked battery in which a plurality of electric elements are stacked and electrically connected in parallel, an occurrence of short circuit in some electric elements by nailing etc. causes electrons to flow from other electric elements into some electric elements (rounding current), and then the temperature locally increases in some electric elements. To avoid such a problem, considered is to provide a short-circuit current shunt part separately from the electric elements (the short-circuit current shunt part causes a short circuit to divide to flow thereto when the electric elements and the short circuit shunt part short-circuit). Making a short circuit in both the short-circuit current shunt part and some electric elements in nailing, and shunting a rounding current from other electric elements not only into some electric elements but also into the short-circuit current shunt part whose short-circuit resistance is small can avoid the local temperature increase in some electric elements (FIG. 7).

The short-circuit current shunt part is positioned close to the electric elements, in view of properly make a short circuit in nailing. Further, the short-circuit current shunt part is next to the electric elements, in view of improving the energy density of the battery. For example, the short-circuit current shunt part is stacked to the electrode group (plurality of electric elements) in a manner to get close to the stacked electrode group. However, the short-circuit current shunt part close to the electric elements may cause the temperature of the electric elements to excessively increase, because the temperature of the short-circuit current shunt part excessively increases short-circuited by nailing etc.

Solution to Problem

The inventors of the present application carried out intensive studies to solve the above problems and found the followings.

(1) In a stacked battery including a short-circuit current shunt part and electric elements, an excessive increase in the temperature of the short-circuit current shunt part in nailing etc. is due to a large amount of rounding current that repeatedly flows from the electric elements into the short-circuit current shunt part whose short circuit resistance is small. If the amount of the current that flows into the short-circuit current shunt part reduces when the temperature of the short-circuit current shunt part reaches a threshold value or more, the temperature of the short-circuit current shunt part does not excessively increase.

(2) Increasing the resistance of the short-circuit current shunt part when the temperature of the short-circuit current shunt part reaches the threshold value or more can reduce the amount of the rounding current that flows into the short-circuit current shunt part.

(3) Providing a PPTC layer between the layers of the short-circuit current shunt part (between the current collector layer and the insulating layer) can increase the resistance of the short-circuit current shunt part when the temperature of the short-circuit current shunt part reaches the threshold value or more.

Based on the above findings, the present application discloses, as a means for solving the above problems, a stacked battery including: at least one short-circuit current shunt part; and a plurality of electric elements, the short-circuit current shunt part and the electric elements being stacked, wherein: the short-circuit current shunt part includes a first current collector layer, a second current collector layer, and an insulating layer provided between the first and second current collector layers, all of these layers being stacked; each electric element includes a cathode current collector layer, a cathode material layer, an electrolyte layer, an anode material layer, and an anode current collector layer, all of these layers being stacked; the first current collector layer is electrically connected to the cathode current collector layer; the second current collector layer is electrically connected to the anode current collector layer; the electric elements are electrically connected to each other in parallel; and the short-circuit current shunt part next to the electric elements includes a PPTC layer between the first current collector layer and the insulating layer and/or between the second current collector layer and the insulating layer.

"Close to" includes the meaning of "next to".

"PPTC layer" is a polymer PTC layer. Here, PTC is "Positive Temperature Coefficient", which is the behavior of an electrical resistance of changing its value with a positive coefficient in accordance with a temperature increase. The PPTC layer at least includes an organic polymer and a conductive material. In the PPTC layer, the crystalline state of the organic polymer and the connection state of the conductive material change with a temperature increase, resulting in an increase of the electrical resistance of the PPTC layer. Examples of the PPTC layer include a layer in which the volume of the organic polymer increases with a temperature increase, to separate or break up the conductive material. In the layer, the separation or breaking up of the conductive material causes the connection number of the conductive material to reduce, resulting in a rapid increase in the electrical resistance of the layer in a non-linear fashion when the temperature of the layer reaches a predetermined value.

In the stacked battery of the present disclosure, the short-circuit current shunt part preferably includes a first short-circuit current shunt part close to the electric elements, and a second short-circuit current shunt part located on a side of the first short-circuit current shunt part opposite to the electric elements; the first short-circuit current shunt part preferably includes the PPTC layer; and the second short-circuit current shunt part preferably includes no PPTC layer.

In the stacked battery of the present disclosure, wherein the directions as follows are preferably the same directions: a direction of stacking the cathode current collector layer, the cathode material layer, the electrolyte layer, the anode material layer, and the anode current collector layer in each electric element, a direction of stacking the electric elements, a direction of stacking the first current collector layer, the insulating layer, and the second current collector layer in the short-circuit current shunt part, and a direction of stacking the short-circuit current shunt part and the electric elements.

In the stacked battery of the present disclosure, the short-circuit current shunt part is preferably provided at least outside the electric elements.

Advantageous Effects

The stacked battery of the present disclosure can flow the rounding current that is produced when a short circuit is made by nailing etc. into the short-circuit current shunt part, and can hold down a temperature increase inside the electric elements. When the temperature of the short-circuit current shunt part reaches a threshold value or more, the stacked battery increases the resistance of the PPTC layer, and then reduce the amount of the current that flows into the short-circuit current shunt part. This eliminates an excessive increase in the temperature of the short-circuit current shunt part, and eliminates an excessive increase in the temperature of the electric elements arranged next to the short-circuit current shunt part.

DETAILED DESCRIPTION OF EMBODIMENTS

1. Stacked battery 100

Figure 1:
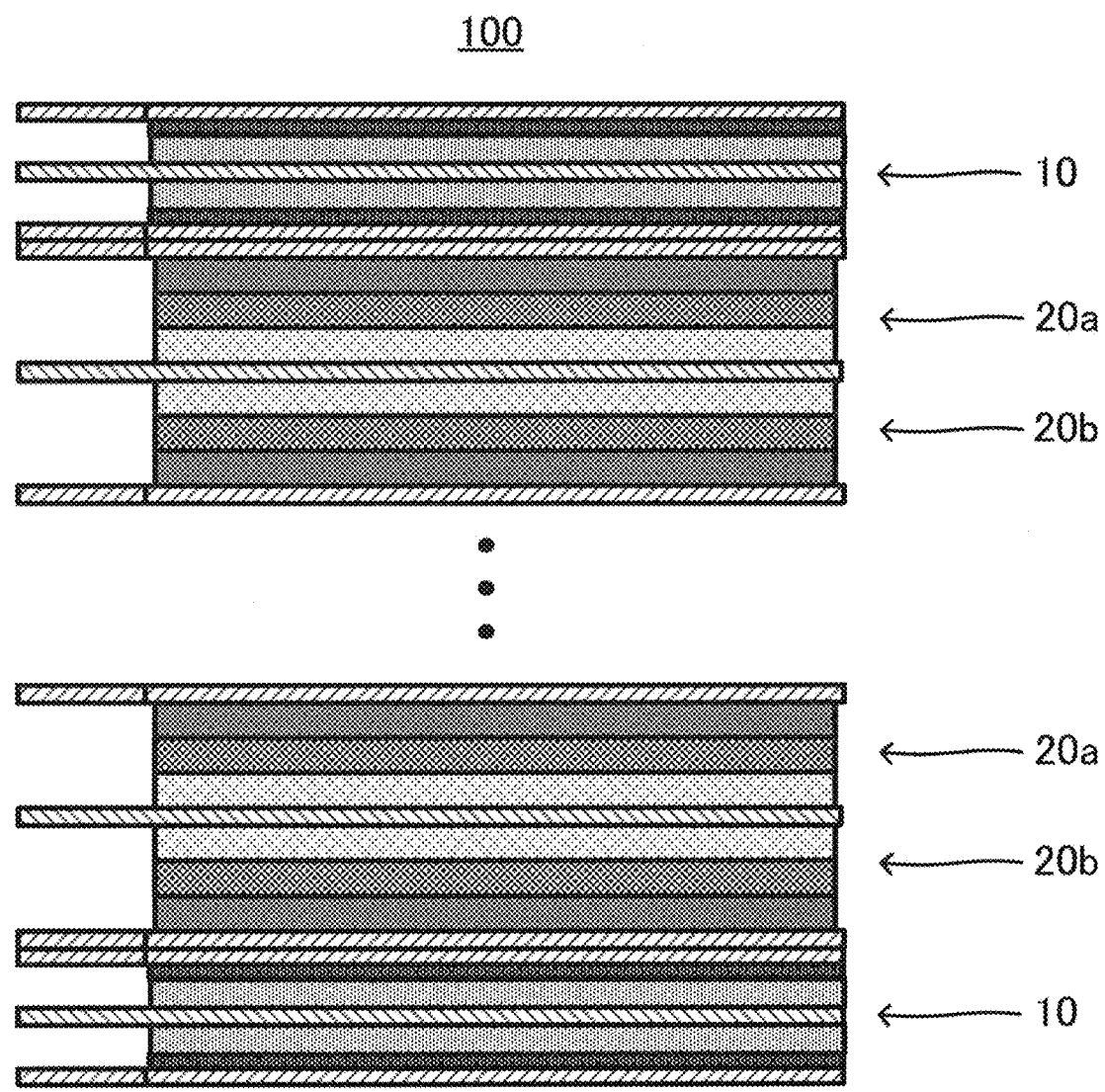
FIG. 1 is a schematic view to explain a layer structure of a stacked battery 100.
Figure 2A:
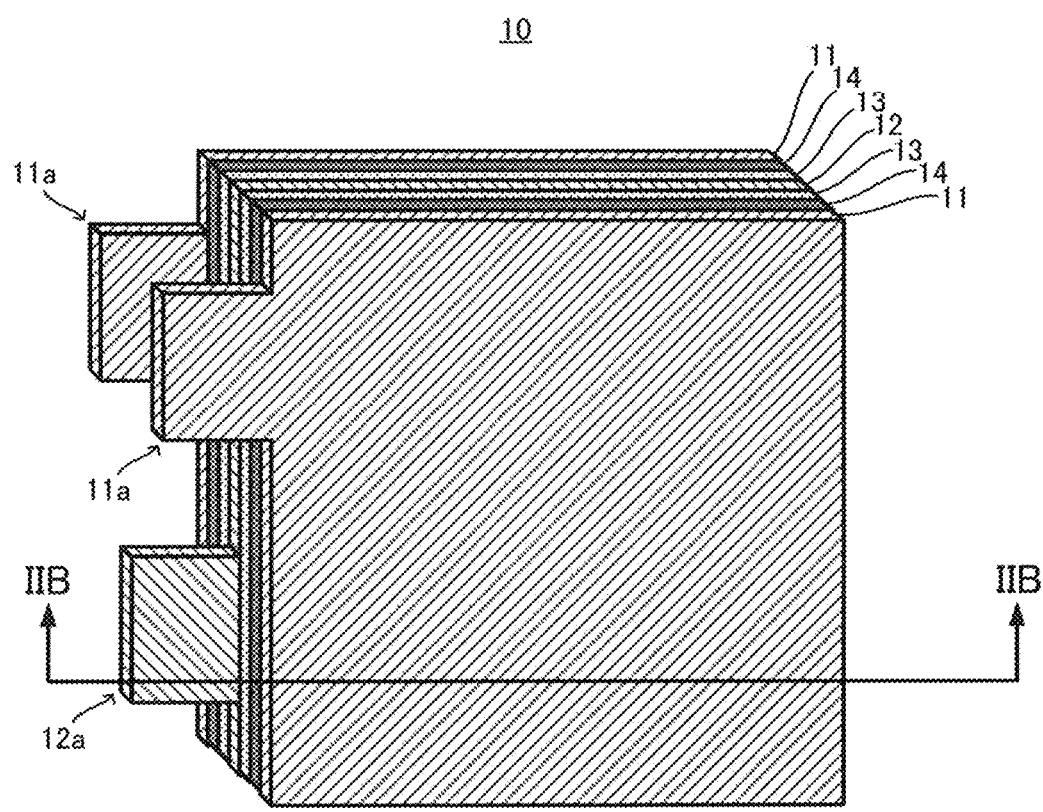
FIG. 2A is an outer perspective view of a short-circuit current shunt part 10.
Figure 2B:
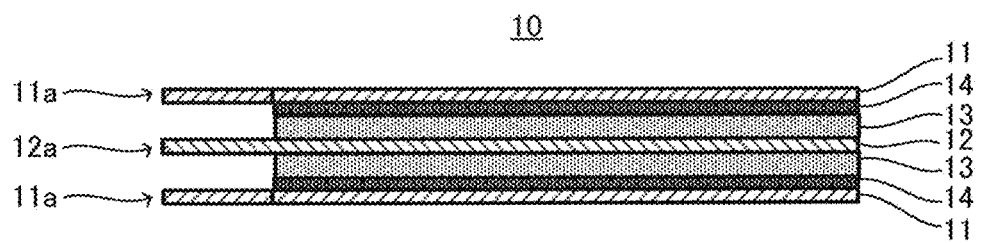
FIG. 2B is a cross-sectional view taken along IIB-IIB in the short-circuit current shunt part 10, both explaining a layer structure of the short-circuit current shunt part 10.
Figure 3A:
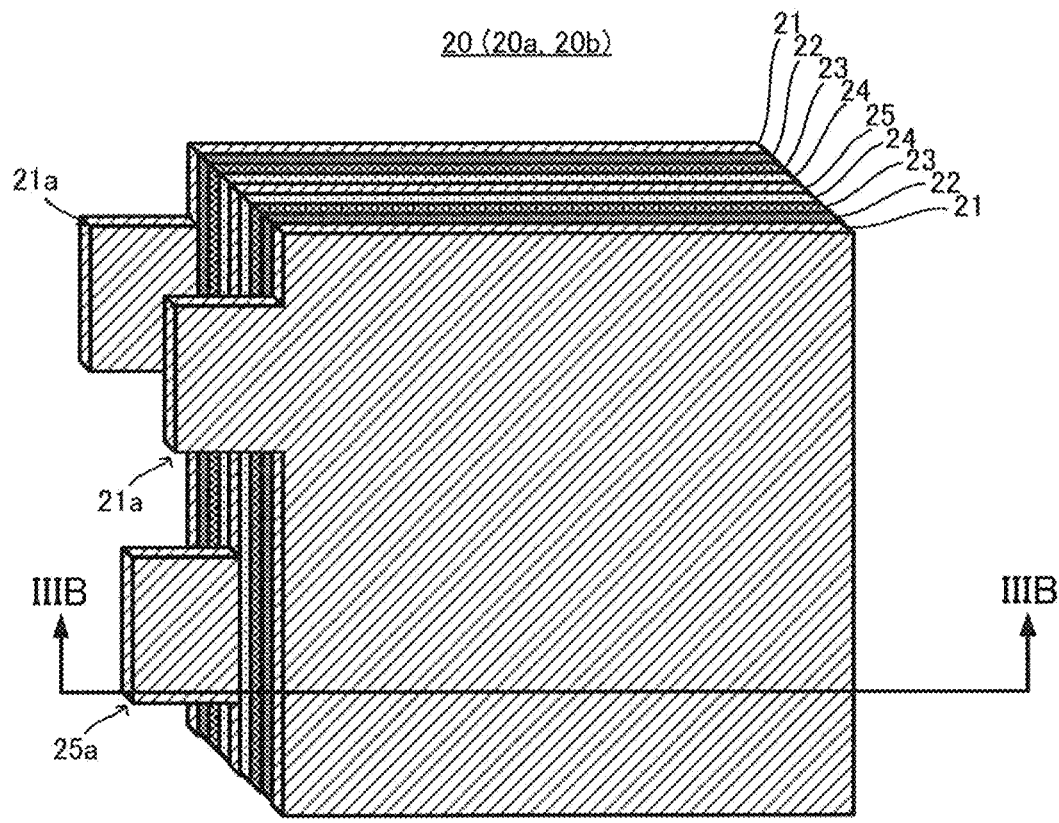
FIG. 3A is an outer perspective view of an electric element 20.
Figure 3B:
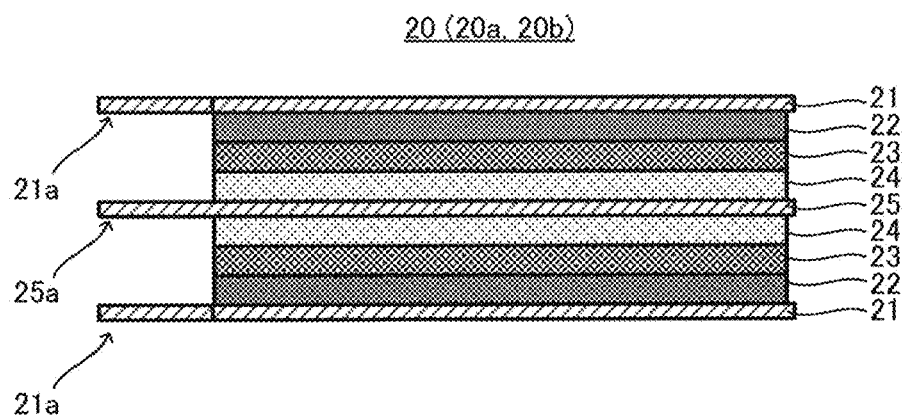
FIG. 3B is a cross-sectional view taken along IIIB-IIIB in the electric element 20, both explaining a layer structure of the electric element 20.

FIG. 1 schematically shows a layer structure of a stacked battery 100. Portions where current collector layers are connected (current collector tabs), and battery case, etc. are omitted in FIG. 1 for convenient explanation. FIGS. 2A and 2B schematically show a layer structure of a short-circuit current shunt part 10 of the stacked battery 100. FIG. 2A is an outer perspective view and FIG. 2B is a IIB-IIB cross-sectional view. FIGS. 3A and 3B schematically show a layer structure of an electric element 20 of the stacked battery 100. FIG. 3A is an outer perspective view and FIG. 3B is a IIB-IIB cross-sectional view.

As shown in FIGS. 1 to 3B, the stacked battery 100 includes at least one short-circuit current shunt part 10 and a plurality of electric elements 20, 20, . . . . In the short-circuit current shunt part 10, a first current collector layer 11, a second current collector layer 12, and an insulating layer 13 provided between the first and second current collector layers 11 and 12 are stacked. In each electric element 20, a cathode current collector layer 21, a cathode material layer 22, an electrolyte layer 23, an anode material layer 24, and an anode current collector layer 25 are stacked. In the stacked battery 100, the first current collector layer 11 is electrically connected to the cathode current collector layer 21, the second current collector layer 12 is electrically connected to the anode current collector layer 25, and the plurality of electric elements 20, 20, . . . are electrically connected in parallel. Here, a feature of the stacked battery 100 is that the short-circuit current shunt part 10 close to the electric elements 20, 20, . . . includes a PPTC layer 14 between the first current collector layer 11 and the insulating layer 13 and/or between the second current collector layer 12 and the insulating layer 13.

1.1. Short-Circuit Current Shunt Part 10

The short-circuit current shunt part 10 includes the first current collector layer 11, the second current collector layer 12, and the insulating layer 13 provided between the first and second current collector layers 11 and 12. The short-circuit current shunt part 10 further includes the PPTC layer 14 between the first current collector layer 11 and the insulating layer 13 and/or between the second current collector layer 12 and the insulating layer 13. When the battery is normally used, the first current collector layer 11 and the second current collector layer 12 are properly insulated in the short-circuit current shunt part 10 of such a structure by the insulating layer 13. When a short circuit occurs in nailing, the first current collector layer 11 and the second current collector layer 12 contact each other, then the electrical resistance decreases.

1.1.1. First Current Collector Layer 11 and Second Current Collector Layer 12

The first current collector layer 11 and the second current collector layer 12 may be formed of metal foil, metal mesh, and the like. In particular, metal foil is preferable. Examples of metal for forming the current collector layers 11 and 12 include Cu, Ni, Al, Fe, Ti, Zn, Co, Cr, Au, Pt, and stainless steel.

Each thickness of the first and second current collector layers 11 and 12 is not limited to particular values. For example, the thickness is preferably 0.1 µm to 1 mm, and more preferably 1 µm to 100 µm. The current collector layers 11 and 12 of such a range of thickness can more properly contact each other when nailed, and can more properly cause a short circuit in the short-circuit current shunt part 10.

As shown in FIG. 2, the first current collector layer 11 has a current collector tab 11a. The first current collector layer 11 is electrically connected to each cathode current collector layer 21 of the electric elements 20, 20, . . . via the current collector tab 11a. The second current collector layer 12 has a current collector tab 12a. The second current collector layer 12 is electrically connected to each anode current collector layer 25 of the electric elements 20, 20, . . . via the current collector tab 12a. The material of the current collector tab 11a may be the same as or different from the material of the first current collector layer 11. The material of the current collector tab 12a may be the same as or different from the material of the current collector layer 12. Each electrical resistance in the current collector tabs 11a and 12a is preferably smaller than each electrical resistance in a cathode current collector tab 21a and an anode current collector tab 25a which are described later, in view of making larger amount of rounding current flow into the short-circuit current shunt part 10 when a short circuit occurs in nailing etc.

1.1.2. Insulating Layer 13

The insulating layer 13 of the stacked battery 100 may be formed of any material that insulates the first current collector layer 11 and the second current collector layer 12 in normal use of the battery. The insulating layer 13 may be formed of an organic material, an inorganic material, or a mixture of an organic material and an inorganic material. In particular, an organic material is preferable. This is because an inorganic material has an advantage of low probability of short circuit caused by cracking in normal use.

As the organic material for forming the insulating layer 13, various resins may be used. Examples of the resins include various thermoplastic resins and various thermosetting resins. In particular, super engineering plastics such as polyimide, polyamide-imide, polyetheretherketone, and polyphenylene sulfide are preferable. Thermosetting resins usually have higher thermal stability than thermoplastic resins, and hard and brittle. That is, when the insulating layer 13 is formed of a thermosetting resin, the insulating layer 13 easily fractures in nailing to the short-circuit current shunt part 10, which can prevent the insulating layer 13 from following deformations of the first current collector layer 11 and the second current collector layer 12, and can more easily make the first current collector layer 11 and the second current collector layer 12 contact each other. Forming the insulating layer 13 of a thermosetting resin can also inhibit thermal decomposition of the insulating layer 13 even when the temperature of the insulating layer 13 increases.

As the inorganic material for forming the insulating layer 13, various ceramics may be used. For example, inorganic oxides may be used. The insulating layer 13 may also be formed of a metal foil having an oxide coating on its surface. Examples of such a metal foil include an aluminum foil having an aluminum oxide coating on its surface, the coating being formed of anodic oxide coating on the surface of the aluminum foil by alumite treatment. In this case, the thickness of the oxide coating is preferably 0.01 μm to 5 μm. The lower limit is more preferably 0.1 μm or over, and the upper limit is more preferably 1 μm or less.

The thickness of the insulating layer 13 is not limited to particular values. For example, the thickness is preferably 0.1 μm to 1 mm, and more preferably 1 μm to 100 μm. The insulating layer 13 of such a range of thickness can more properly insulate the first current collector layer 11 and the second current collector layer 12 in normal use of the battery, and can more properly make the first current collector layer 11 and the second current collector layer 12 have a conduction, to cause an internal short circuit, when the first and second current collector layers 11 and 12 are deformed by external stress such as nailing.

1.1.4. PPTC Layer 14

In the short-circuit current shunt part 10, the PPCT layer 14 is provided between the first current collector 11 and the insulating layer 13 and/or between the second current collector layer 12 and the insulating layer 13. The PPTC layer 14 is a layer of a polymer PTC layer. That is, the PPTC layer at least includes an organic polymer and a conductive material, in which the crystalline state of the organic polymer and the connection state of the conductive material change with a temperature increase, resulting in an increase of its electrical resistance. Examples of the PPTC layer 14 include a layer in which the volume of the organic polymer increases with a temperature increase, to separate or break up the conductive material. In the layer, the separation or breaking up of the conductive material reduces the connection number of the conductive material, resulting in a rapid increase in the electrical resistance of the layer in a non-linear fashion when the layer reaches a predetermined temperature. For example, when the stacked battery 100 is an all-solid-state battery, the PPTC layer 14 preferably rapidly increases its electrical resistance in a non-linear fashion at a temperature of 120□ to 250□.

The organic polymer for forming the PPTC layer 14 is not limited to particular types. Examples of the organic polymer include polyvinylidene fluoride (PVDF), polypropylene (PP), and polyethylene (PE). Among them, PVDF is preferable. This is because PVDF has an advantage in view of thermal stability. The conductive material for forming the PPTC layer 14 is not limited to particular types. Examples of the conductive material include carbon particles, and various metal particles. Among them, carbon particles are preferable. This is because carbon particles can sterically secure the conductivity of the PPTC layer 14 in a small amount. The PPTC layer 14 may contain other materials such as filler, if necessary. Examples of the filler include alumina particles.

The mixing ratio of the organic polymer, the conductive material, and other optional materials in the PPTC layer 14 is not limited to particular values. The mixing ratio may be adequately determined depending on the aiming performances (temperature at which the resistance changes, etc.). For example, the volume ratio of the organic polymer and the conductive material may be 3:1 to 10:1. The thickness of the PPTC layer 14 is not limited to particular values either. For example, the thickness is preferably 0.1 μm to 1 mm, and more preferably 1 μm to 100 μm, though depending on the size of the conductive material.

The PPTC layer 14 only needs to be provided between the first current collector layer 11 and the insulating layer 13 and/or between the second current collector layer 12 and the insulating layer 13. For example, a face of the first current collector layer 11 facing to the insulating layer 13 may be fully covered with the PPTC layer 14, a face of the second current collector layer 12 facing to the insulating layer 13 may be fully covered with the PPTC layer 14, or at least one face of the insulating layer 13 may be covered with the PPTC layer.

1.2. Electric Element 20

The electric element 20 includes the cathode current collector layer 21, the cathode material layer 22, the electrolyte layer 23, the anode material layer 24, and the anode current collector layer 25, all these layers being stacked. That is, the electric element 20 may function as a single battery.

1.2.1. Cathode Current Collector Layer 21

The cathode current collector layer 21 may be formed of foil, metal mesh, etc. In particular, metal foil is preferable. Examples of the metal for forming the cathode current collector layer 21 include Ni, Cr, Au, Pt, Al, Fe, Ti, Zn, and stainless steel. The cathode current collector layer 21 may have a coat layer on its surface to adjust its contact resistance. Examples of the coat layer include a carbon coat layer. The thickness of the cathode current collector layer 21 is not limited to particular values. For example, the thickness is preferably 0.1 μm to 1 mm, and more preferably 1 μm to 100 μm.

As shown in FIGS. 3A and 3B, the cathode current collector layer 21 preferably has the cathode current collector tab 21a at a part of its outer edge. The tab 21a can easily connect the first current collector layer 11 and the cathode current collector layer 21 electrically, and can easily connect the cathode current collector layers 21, 21, . . . electrically in parallel.

1.2.2. Cathode Material Layer 22

The cathode material layer 22 at least includes an active material. When the stacked battery 100 is an all-solid-state battery, the cathode material layer 22 may optionally include a solid electrolyte, a binder, a conductive assistant, etc., in addition to the active material. When the stacked battery 100 is an electrolyte solution battery, the cathode material layer 22 may optionally include a binder, a conductive assistant, etc., in addition to the active material. Known active materials may be used as the active material. Among known active materials, two materials of different potentials at which predetermined ions are absorbed and released (charge-discharge potential) may be selected, and from the two materials, a material having the nobler potential may be used as a cathode active material, and a material having the baser potential may be used as an anode active material which is described later. For example, when a lithium ion battery is formed, various lithium-containing composite oxides, such as lithium cobalt oxide, lithium nickel oxide, $LiNi_{1/3}Co_{1/3}Mn_{1/3}O_2$, lithium manganese oxide, and spinel type lithium compounds, may be used as the cathode active material. When the stacked battery 100 is an all-solid-state battery, the surface of the cathode active material may be coated with an oxide layer, such as lithium niobate layer, lithium titanate layer, and lithium phosphate layer. When the stacked battery 100 is an all-solid-state battery, the solid electrolyte is preferably an inorganic solid electrolyte. This is because inorganic solid electrolytes have high ion conductivity and excellent in heat resistance, compared to organic polymer electrolytes. Further, inorganic solid electrolytes are preferable because the pressure applied to the electric element 20 is high in nailing and then the effect of the stacked battery 100 of the present application is remarkably exerted with inorganic solid electrolytes, compared to organic polymer electrolytes. Examples of the inorganic solid electrolyte include oxide solid electrolytes such as lithium lanthanum zirconate, and sulfide solid electrolytes such as $Li_2S$—$P_2S_5$. In particular, a sulfide solid electrolyte that contains $Li_2S$—$P_2S_5$ is preferable, and a sulfide solid electrolyte that contains 50 mol % or more of $Li_2S$—$P_2S_5$ is more preferable. As the binder, various types of binders, such as butadiene rubber (BR), acrylate butadiene rubber (ABR), and polyvinylidene fluoride (PVDF), may be used. Examples of the conductive assistant include carbon materials such as acetylene black and Ketjen black, and metal materials such as nickel, aluminum, and stainless steel. The content of each component of the cathode material layer 22 may be the same as before. The shape of the cathode material layer 22 may also be the same as before. In particular, the cathode material layer 22 formed into a sheet is preferable, in view of easily forming the stacked battery 100. In this case, the thickness of the cathode material layer 22 is for example preferably 0.1 μm to 1 mm, and more preferably 1 inn to 150 μm.

1.2.3. Electrolyte Layer 23

The electrolyte layer 23 at least includes an electrolyte. When the stacked battery 100 is an all-solid-state battery, the electrolyte layer 23 may contain a solid electrolyte and may optionally contain a binder. The solid electrolyte is preferably selected from the above-mentioned inorganic solid electrolytes. The binder may be adequately selected from the binders that may be used for the cathode material layer 22. The content of each component of the solid electrolyte layer 23 may be the same as before. The shape of the solid electrolyte layer 23 may also be the same as before. In particular, the solid electrolyte layer 23 formed into a sheet is preferable, in view of easily forming the stacked battery 100. In this case, the thickness of the solid electrolyte layer 23 is for example preferably 0.1 μm to 1 mm, and more preferably 1 μm to 100 μm. When the stacked battery 100 is an electrolyte solution battery, the electrolyte layer 23 includes an electrolyte solution and a separator. The electrolyte solution and separator are obvious to those skilled in the art, and their detailed explanations are omitted here.

1.2.4. Anode Material Layer 24

The anode material layer 24 at least includes an active material. When the stacked battery 100 is an all-solid-state battery, the anode material layer 24 may optionally include a solid electrolyte, a binder, a conductive assistant, etc., in addition to the active material. When the stacked battery 100 is an electrolyte solution battery, the anode material layer 24 may optionally include a binder, a conductive assistant, etc., in addition to the active material. Known active materials may be used as the active material. Among known active materials, two materials of different potentials at which predetermined ions are absorbed and released (charge-discharge potential) may be selected, and from the two materials, the material having the nobler potential may be used as the cathode active material, and the material having the baser potential may be used as the anode active material. For example, when a lithium ion battery is formed, examples of the anode active material include carbon materials such as graphite and hard carbon, various oxides such as lithium titanate, Si, Si alloy, lithium metal, and lithium alloy. The solid electrolyte, the binder, and the conductive assistant in the anode material layer 24 may be adequately selected from the solid electrolytes, the binders, and the conductive assistants that may be used for the cathode material layer 22. Each content of the components in the anode material layer 24 may be the same as before. The shape of the anode material layer 24 may also be the same as before. In particular, the anode material layer 24 formed into a sheet is preferable, in view of easy forming the stacked battery 100. In this case, the thickness of the anode material layer 24 is, for example, preferably 0.1 μm to 1 mm, and more preferably 1 μm to 100 μm. It is noted that the thickness of the anode material layer 24 may be preferably determined such that the volume of the anode is larger than the volume of the cathode.

1.2.5. Anode Current Collector Layer 25

The anode current collector layer 25 may be formed of metal foil, metal mesh, etc. In particular, metal foil is preferable. Examples of the metal for forming the anode current collector layer 25 include Cu, Ni, Fe, Ti, Co, Zn, and stainless steel. The anode current collector layer 25 may have a coat layer on its surface to adjust its contact resistance. Examples of the coat layer include a carbon coat layer. The thickness of the anode current collector layer 25 is not limited to particular values. For example, the thickness is preferably 1 μm to 1 mm, and more preferably 1 μm to 100 μm.

As shown in FIGS. 3A and 3B, the anode current collector layer 25 preferably has the anode current collector tab 25*a* at a part of its outer edge. The tab 25*a* may easily connect the second current collector layer 12 and the anode current collector layer 25 electrically, and may easily connect the anode current collector layers 25, 25, . . . electrically in parallel.

1.4. Arrangement and Connection State of Short-Circuit Current Shunt Part and Electric Elements 1.4.1. Arrangement of Electric Elements The number of the electric elements 20, 20, . . . stacked in the stacked battery 100 is not limited to particular values. The number may be properly determined depending on aimed battery power. The plurality of electric elements 20, 20, . . . may be stacked in a manner to directly contact each other, and may be stacked via another layer (e.g. insulating layer) or gap (air layer). As shown in FIG. 1, the plurality of electric elements 20, 20, . . . are preferably stacked in a manner to directly contact each other, in view of improving the output density of the battery. In addition, as shown in FIGS. 1, 3A and 3B, two of the electric elements 20*a* and 20*b* share one anode current collector layer 25. This further improves the output density of the battery. Further, as shown in FIG. 1, a direction of stacking the plurality of electric elements 20, 20, . . . and a direction of stacking the layers 21 to 25 in each electric element 20 are preferably the same in the stacked battery 100. This easily bundles the stacked battery 100, resulting in a further improvement of the output density of the battery.

1.4.2. Electrical Connection of Electric Elements

The plurality of electric elements 20, 20, . . . are electrically connected in parallel in the stacked battery 100. When one of the electric elements having such a parallel connection short-circuits, electrons concentrates to the electric element having a short circuit from other electric elements. That is, such electric elements having a parallel connection easily have a large Joule heat when the battery short-circuits. In other words, the effect of providing the short-circuit current shunt part 10 is more remarkably exerted in the stacked battery comprising the plurality of electric elements 20, 20, . . . that have an electrically parallel connection. As a member to electrically connect the plurality of electric elements 20, 20, . . . , a known member may be used. For example, as described above, the plurality of electric elements 20, 20, . . . may be electrically connected to each other in parallel, via the cathode current collector tab 21*a* provided to the cathode current collector layer 21 and the anode current collector tab 25*a* provided to the anode current collector layer 25.

1.4.3. Electrical Connection of Short-Circuit Current Shunt Part and Electric Elements In the stacked battery 100, the first current collector layer 11 of the short-circuit current shunt part 10 is electrically connected to the cathode current collector layer 21 of the electric element 20, and the second current collector layer 12 of the short-circuit current shunt part 10 is electrically connected to the anode current collector layer 25 of the electric element 20. When a short circuit occurs for example in the short-circuit current shunt part 10 and some electric elements (e.g. electric element 20*a*), electrically connecting the short-circuit current shunt part 10 and the electric element 20 like this can make a large rounding current flow into the short-circuit current shunt part 10 from other electric elements (e.g. electric element 20*b*). As the member to electrically connect the short-circuit current shunt part 10 and the electric elements 20, 20, . . . , a known member may be used. For example, as described above, the first current collector tab 11*a* provided to the first current collector layer 11 and the second current collector tab 12*a* provided to the second current collector layer 12 can electrically connect the short-circuit current shunt part 10 and the electric elements 20, 20, . . . .

1.4.4. Positional Relationship Between Short-Circuit Current Shunt Part and Electric Elements The short-circuit current shunt part 10 and the plurality of electric elements 20, 20, . . . only need to be stacked together. In this case, the short-circuit current shunt part 10 and the electric elements 20, 20, . . . may be directly stacked, or may be indirectly stacked via another layer (insulating layer, air layer, etc.) as long as the above problems are solved. When the short-circuit current shunt part 10 and the electric elements 20, 20, . . . are directly stacked, the above-mentioned problems obviously occur. The effect of the stacked battery of the present disclosure is considered to be exerted more remarkably when the short-circuit current shunt part 10 is directly stacked to the electric elements 20, 20, . . . and comes next to the electric elements 20, 20, . . . . On the other hand, the above-mentioned problems may occur even when the short-circuit current shunt part 10 is indirectly stacked to the electric elements 20, 20, . . . . That is, even when the short-circuit current shunt part 10 is indirectly stacked to the electric elements 20, 20 . . . via another layer, heat insulation may not be sufficiently achieved between the short-circuit current shunt part 10 and the electric elements 20, 20, . . . as long as the short-circuit current shunt part 10 is close to the electric elements 20, 20, . . . . The short-circuit current shunt part 10 may be stacked outside the plurality of electric elements 20, 20, . . . may be stacked between the plurality of electric elements 20, 20, . . . , or may be stacked both outside and between the plurality of power generation elements 20, 20, . . . . In particular, as shown in FIG. 1, the short-circuit current shunt part 10 is preferably provided at least outside the electric elements 20, 20, . . . when the short-circuit current shunt part 10 and the plurality of electric elements 20, 20, . . . are stacked. This makes a short circuit occur in the short-circuit current shunt part 10 before in the plurality of electric elements 20, 20, . . . and then makes a rounding current flow from the electric elements 20, 20, . . . into the short-circuit current shunt part 10, resulting in an inhibition of heat generation inside the electric elements 20, 20, . . . .

A short circuit of the battery by nailing easily occurs when the electric element 20 is nailed from a direction of the cathode current collector layer 21 toward a direction of the anode current collector layer 25 (or, from the anode current collector layer 25 toward the cathode current collector layer 21) of the electric element 20. In this point, the direction of nailing and the direction of stacking each layer are preferably the same in the stacked battery 100. In more detail, in the stacked battery 100, the direction of stacking the cathode current collector layer 21, the cathode material layer 22, the electrolyte layer 23, the anode material layer 24, and the anode current collector layer 25 in each electric element 20, the direction of stacking the plurality of electric elements 20, 20, . . . , the direction of stacking the first current collector layer 11, the insulating layer 13, and the second current collector layer 12 in the short-circuit current shunt part 10, and the direction of stacking the short-circuit current shunt part 10 and the plurality of electric elements 20, 20, . . . are preferably the same.

1.4.5. Relationship Between Short-Circuit Current Shunt Part and Electric Elements in Size In the stacked battery 100, the short circuit easily occurs in the short-circuit current shunt part 10 before in the electric elements 20, 20, . . . when the stacked battery is nailed, by making the short-circuit current shunt part 10 cover as much portion of the electric elements 20, 20, . . . as possible. In this viewpoint, in the stacked battery 100 for example, the outer edge of the short-circuit current shunt part 10 is preferably provided outside the outer edges of the electric elements 20, 20, . . . when seen from the direction of stacking the short-circuit current shunt part 10 and the plurality of power elements 20, 20, . . . . Or, as shown in FIG. 1, when the direction of stacking the plurality of electric elements 20, 20, . . . and the direction of stacking the layers 21 to 25 in each electric element 20 are the same, the outer edge of the short-circuit current shunt part 10 is preferably provided outside the outer edges of the cathode material layer 22, the electrolyte layer 23, and the anode material layer 24 when seen from the direction of stacking the short-circuit current shunt part 10 and the plurality of the electric elements 20, 20, . . . . In this case, it is noted that the layers are located such that the first current collector layer 11 of the short-circuit current shunt part 10 and the anode current collector layer 25 of the electric element 20 do not have short circuit. That is, an insulator or the like needs to be provided between the short-circuit current shunt part 10 and the electric elements 20, 20, . . . to prevent a short circuit from occurring between the short-circuit current shunt part 10 and the electric elements 20, 20, . . . even when the short-circuit current shunt part 10 is large.

On the other hand, in view of further increasing the energy density of the battery, and in view of easily preventing a short circuit between the short-circuit current shunt part 10 and the electric elements 20, 20, . . . , the short-circuit current shunt part 10 may be made as small as possible. That is, in these viewpoints, the outer edge of the short-circuit current shunt part 10 is preferably located on an inner side than the outer edges of the electric elements 20, 20, . . . when seen from the direction of stacking the short-circuit current shunt part 10 and the plurality of electric elements 20, 20, . . . in the stacked battery 100. Or, in a case where the direction of stacking the plurality of electric elements 20, 20, . . . and the direction of stacking the layers 21 to 25 in each electric element 20 are the same, the outer edge of the short-circuit current shunt part 10 is preferably located on an inner side than the outer edges of the cathode material layer 22, the electrolyte layer 23, and the anode material layer 24, when seen from the direction of stacking the short-circuit current shunt part 10 and the plurality of the electric elements 20, 20, . . . .

As described above, the stacked battery 100 can flow a rounding current into the short-circuit current shunt part 10 when a short circuit is occurred by nailing etc. in the stacked battery 100, and can hold down the temperature inside the electric element 20. On the other hand, when the temperature of the short-circuit current shunt part 10 reaches a threshold value or more, the resistance of the PPTC layer 14 increases and the amount of the current that flows in the short-circuit current shunt part 10 decreases. This eliminates an excessive increase in the temperature of the short-circuit current shunt part 10, and eliminates an excessive increase in the temperature of the electric element 20 close to the short-circuit current shunt part 10.

2. Stacked Battery 200

Figure 4:
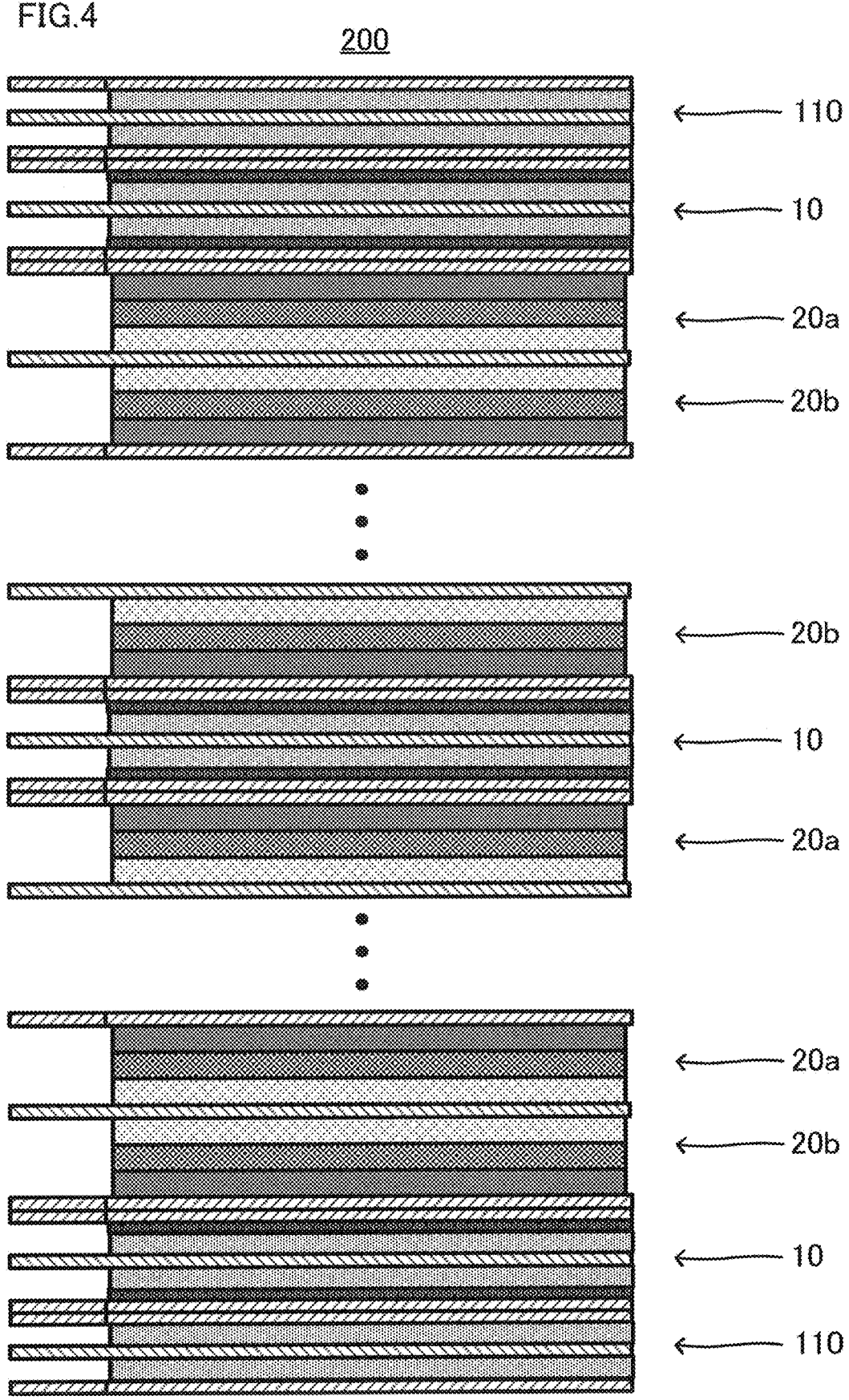
FIG. 4 is a schematic view to explain a layer structure of a stacked battery 200.
Figure 5A:
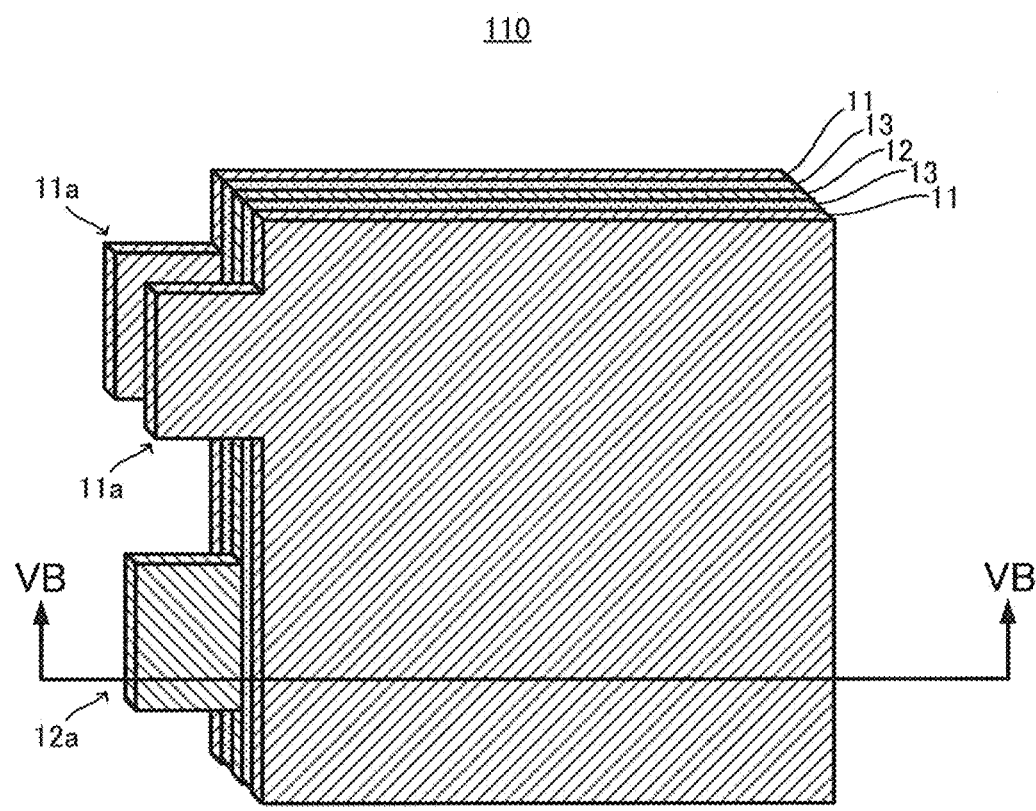
FIG. 5A is an outer perspective view of a short-circuit current shunt part 110.
Figure 5B:
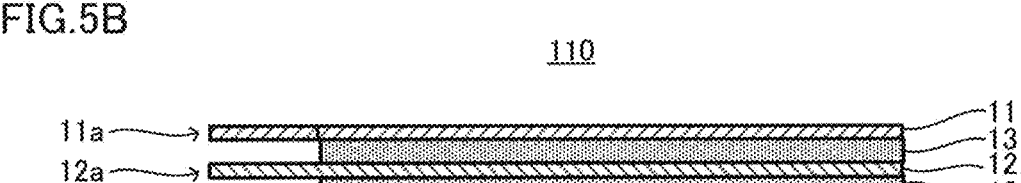
FIG. 5B is a cross-sectional view taken along VB-VB in the short-circuit current shunt part 110, both explaining a layer structure of the short-circuit current shunt part 110.

FIG. 4 schematically shows a layer structure of the stacked battery 200. As shown in FIG. 4, the stacked battery 200 includes the short-circuit current shunt part 10 and a short-circuit current shunt part 110. FIGS. 5A and 5B schematically show a structure of the short-circuit current shunt part 110. FIG. 5A is an outer perspective view, and FIG. 5B is a VB-VB cross-sectional view. The structure of the stacked battery 200 other than the short-circuit current shunt part 110 is the same as the structure of the stacked battery 100.

As shown in FIG. 4, the stacked battery 200 includes, as short-circuit current shunt parts, a first short-circuit current shunt part 10 close to the electric elements 20, 20, . . . and a second short-circuit current shunt part 110 located on a side of the first short-circuit current shunt part 10 opposite to the electric elements 20, 20, . . . . Here, as mentioned above, a feature of the stacked battery 200 is that the PPTC layer 14 is provided to the first short-circuit current shunt part 10, but not to the second short-circuit current shunt part 110, as shown in FIGS. 5A and 5B.

When the temperature and resistance of the short-circuit current shunt part 10 increase at an early stage due to a rounding current with a short circuit caused by nailing etc. in the stacked battery 100 described above, the rounding current that is supposed to subsequently flow in the short-circuit current shunt part 10 might flow in the electric elements 20, 20, . . . whose short circuit resistance is small. That is, an excessive temperature increase of the short-circuit current shunt part 10 can be held down, whereas the temperature of the electric elements 20, 20, . . . may increase. On the other hand, as described above, the temperature increase of the short-circuit current shunt part 10 next to the electric elements 20, 20, . . . needs to be held down as much as possible.

In the stacked battery 200, even when the temperature and resistance of the short-circuit current shunt part 10 increase at an early stage due to a rounding current with a short circuit occurred in the short-circuit current shunt parts 10 and 110 in nailing etc., it is possible to subsequently flow a large amount of rounding current into the short-circuit current shunt part 110 after that. That is, an excessive temperature increase in the electric elements 20, 20, . . . may be held down by holding down an excessive temperature increase in the short-circuit current shunt part 10 next to the electric elements 20, 20, . . . , and at the same time, a temperature increase in the electric element 20, 20, . . . may be held down by flowing a large amount of rounding current into the short-circuit current shunt part 110.

3. Method of Producing Stacked Battery

The short-circuit current shunt part 10 may be easily produced by: providing the PPTC layer 14 over at least one of a surface of the first current collector layer 11 (e.g. metal foil) and a surface of the second current collector layer 12 (e.g. metal foil); disposing the insulating layer 13 (e.g. insulation film) between the first current collector layer 11 and the second current collector layer 12, such that the PPTC layer 14 is positioned between the insulating layer 13 and the current collector layers 11 and 12. As shown in FIGS. 2A and 2B, the insulating layer 13 may be disposed over both faces of the second current collector layer 12, the PPTC layer 14 may be disposed over a face of each insulating layer 13 opposite to the second current collector layer 12, and the first current collector layer 11 may be disposed over a face of each PPTC layer 14 opposite to the insulating layer 13. The short-circuit current shunt part 110 may be easily produced by disposing the insulating layer 13 (e.g. insulation film) between the first current collector layer 11 (e.g. metal foil) and the second current collector layer 12 (e.g. metal foil). As shown in FIGS. 5A and 5B, the insulating layer 13 may be disposed over both faces of the second current collector layer 12, and the first current collector layer 11 may be further disposed over a face of each insulating layer 13 opposite to the second current collector layer 12.

Here, each layer of the short-circuit current shunt parts 10 and 110 may be attached together by adhesive, resin, etc., to keep the shape of the short-circuit current shunt parts 10 and 110. In this case, adhesive etc. does not have to be applied to whole surface of each layer, and only need to be applied to part of the surface of each layer.

The electric element 20 may be produced by a known method. For example, when an all-solid-state battery is produced, the electric element 20 may be produced by: applying a cathode material over a surface of the cathode current collector layer 21 by wet method, and then drying the cathode material, to form the cathode material layer 22; applying an anode material over a surface of the anode current collector layer 25, and then dying the anode material, to form the anode material layer 24; transcribing the electrolyte layer 23 that includes a solid electrolyte between the cathode material layer 21 and the anode material layer 24; and then pressing to unify them. The pressure to press them is not limited to particular values, and preferably 2 ton/cm$^2$ or over for example.

The short-circuit current shunt part 10 may be electrically connected to the plurality of the electric elements 20, 20, . . . , and the plurality of the electric elements 20, 20, . . . may be electrically connected in parallel, by: stacking the short-circuit current shunt part 10 produced as above to the plurality of electric element 20, 20, . . . ; connecting the tab 11*a* provided to the first current collector layer 11 to the tab 21*a* of the cathode current collector layer 21; connecting the tab 12*a* provided to the second current collector layer 12 to the tab 25*a* of the anode current collector layer 25; connecting the tabs 21*a*, 21*a*, . . . of the cathode current collector layers 21, 21, . . . to each other; and connecting the tabs 25*a*, 25*a*, . . . of the anode current collector layers 25, 25, . . . to each other. If necessary, the short-circuit current shunt part 110 may be stacked on a side of the short-circuit current shunt part 10 opposite to the electric elements 20, 20, . . . , and the current collector layers 11 and 12 are electrically connected as above. The stacked body electrically connected like this is vacuum-encapsulated in a battery case such as laminate film and stainless steel can, then an all-solid-state battery is produced as a stacked battery. It is noted that these production steps are an example, and the all-solid-state battery may be produced by steps other than these steps. For example, the cathode material layer etc. may be formed by dry method, instead of wet method.

Or, an electrolyte solution battery may be produced as a stacked battery by: disposing a separator instead of the above-described solid electrolyte layer, to make a stacked body electrically connected in the same way as above; and then enclosing the stacked body in a battery case filled with an electrolyte solution. When an electrolyte solution battery is produced, press molding of each layer may be omitted.

In this way, the stacked batteries 100 and 200 may be easily produced by an application of a known method for producing a stacked battery.

4. Supplementary Note

In the above description, the short-circuit current shunt part is formed of two first current collector layers, two insulating layers, and one second current collector layer. However, the stacked battery of the present disclosure is not limited to this structure. The short-circuit current shunt part may be in any form that has an insulating layer between the first current collector layer and the second current collector layer. The number of each layer of the short-circuit current shunt part is not limited to particular values.

In the above description, two electric elements share one anode current collector layer. However, the stacked battery of the present disclosure is not limited to this structure. The electric element may be any element that functions as a single battery, and that has a cathode current collector layer, a cathode material layer, an electrolyte layer, an anode material layer, and an anode current collector layer stacked together.

In the above description, the short-circuit current shunt part is provided on both sides of the stacked battery outside the plurality of electric elements in the direction of stacking. However, the number of the short-circuit current shunt part is not limited to two. The stacked battery may include two or more short-circuit current shunt parts outside the plurality of electric elements. The short-circuit current shunt part may be disposed not only outside the plurality of electric elements in the direction of stacking, but also between the plurality of electric elements.

In the above description, a plurality of electric elements are stacked. The stacked battery not including a plurality of electric elements (single battery) can also exert a certain amount of effect. However, Joule heat due to a short circuit caused by nailing tends to be larger in a plurality of electric elements than in one electric element. This point is an advantage of the stacked battery of the present disclosure in which a plurality of electric elements are stacked, in addition to the effect of providing the short-circuit current shunt part.

In the above description, the current collector tabs project from the short-circuit current shunt parts and the electric elements. However, the stacked battery of the present disclosure does not have to include the current collector tabs. For example, a plurality of current collector layers each having a large area can electrically connect to each other without tabs, by: projecting outer edges of the current collector layers of large area outside from a stacked body that includes the current collector layers of large area, short-circuit current shunt parts, and electric elements; and disposing conductive materials between the projected current collector layers. Or, the current collector layers may be electrically connected to each other with conductive wires, instead of the tabs.

In the above description, the stacked battery may be an electrolyte solution battery or an all-solid-state battery. However, the technique of the present disclosure can exert a greater effect when the stacked battery is an all-solid-state battery. An all-solid-state battery has less gaps in its electric element than an electrolyte solution battery. Then, a large pressure is applied to the electric element of an all-solid-state battery when a nail penetrates the electric element in nailing. Thus, in an all-solid-state battery, the short circuit resistance of the electric element decreases, and a large amount of rounding current flows in the portion where the short circuit occurs in nailing. Further, in an all-solid-state battery, a restraint pressure may be applied to the electric element, to reduce the internal resistance in the electric element. In this case, the restraint pressure is applied in the direction of stacking the electric element (in a direction from the cathode current collector layer toward the anode current collector layer). When the battery is nailed, both a pressure by nailing and the restraint pressure are applied to the electric element. Thus, considered is that the cathode current collector layer and the anode current collector layer easily contact each other to have a short circuit, and the short-circuit resistance of the electric element easily decreases. Thus, the effect of providing a short-circuit current shunt part to make a rounding current shunt is remarkably exerted in an all-solid-state battery. On the other hand, an electrolyte solution battery typically includes an electrolyte solution filled in a battery case and layers immersed in the electrolyte solution. The electrolyte solution is provided in the gaps between the layers. Thus, the pressure applied when an electrolyte solution battery is nailed is small, and then the short-circuit resistance of the electric element increases. The amount of the rounding current to flow in some electric elements in an electrolyte solution battery might be smaller than that in an all-solid-state battery. Thus, the effect of providing a short-circuit current shunt part in an electrolyte solution battery is relatively small, compared to the case where the short-circuit current shunt part is provided in an all-solid-state battery.

When the electric elements are electrically connected in series via a bipolar electrode, nailing to some electric elements causes a rounding current to flow into some electric elements from other electric elements via the nail. That is, the rounding current flows via the nail which is high in contact resistance, and thus the current amount of the rounding current is small. When the electric elements are electrically connected in series via a bipolar electrode, the amount of the rounding current is considered to be the largest when all of the electric elements are nailed. In such a case, discharge of the electric elements has already sufficiently progressed, and then the temperature of some electric elements is difficult to increase locally. In this point, the effect of the short-circuit current shunt part is considered to be small, compared to the case where the electric elements are electrically connected in parallel. Thus, the technique of the present disclosure exerts a remarkable effect especially when the electric elements are electrically connected in parallel in a battery.

EXAMPLES

A PPTC layer was provided over a surface of a metal foil that forms a current collector layer. The temperature dependency of the electrical resistance of the obtained material was checked. Hereinafter an example is shown in which an aluminum foil was used as the metal foil, furnace black was used as a conductive material to form the PPTC layer, PVDF was used as an organic polymer, and alumina was used as a filler. The current collector layer and the PPTC layer used in the stacked battery of the present disclosure are not limited to these materials.

A furnace black (manufactured by Tokai Carbon Co., Ltd.) whose average primary particle diameter was 66 nm was used as a conductive material. Alumina particles (CB-P02 manufactured by SHOWA DENKO K. K.) were used as a filler. PVDF (KF polymer L #9130 manufactured by KUREHA CORPORATION) was used as an organic polymer. The furnace black, alumina particles, and PVDF having a volume ratio of 10:60:30 were mixed with NMP, whereby a paste was produced. The obtained paste was applied over an aluminum foil (1N30 manufactured by UACJ Corporation) of 15 μm in thickness, such that the thickness of the paste after dried was 10 μm. The paste with the aluminum foil was dried in a drying oven, whereby an aluminum foil with PPTC layer was obtained.

Figure 6:
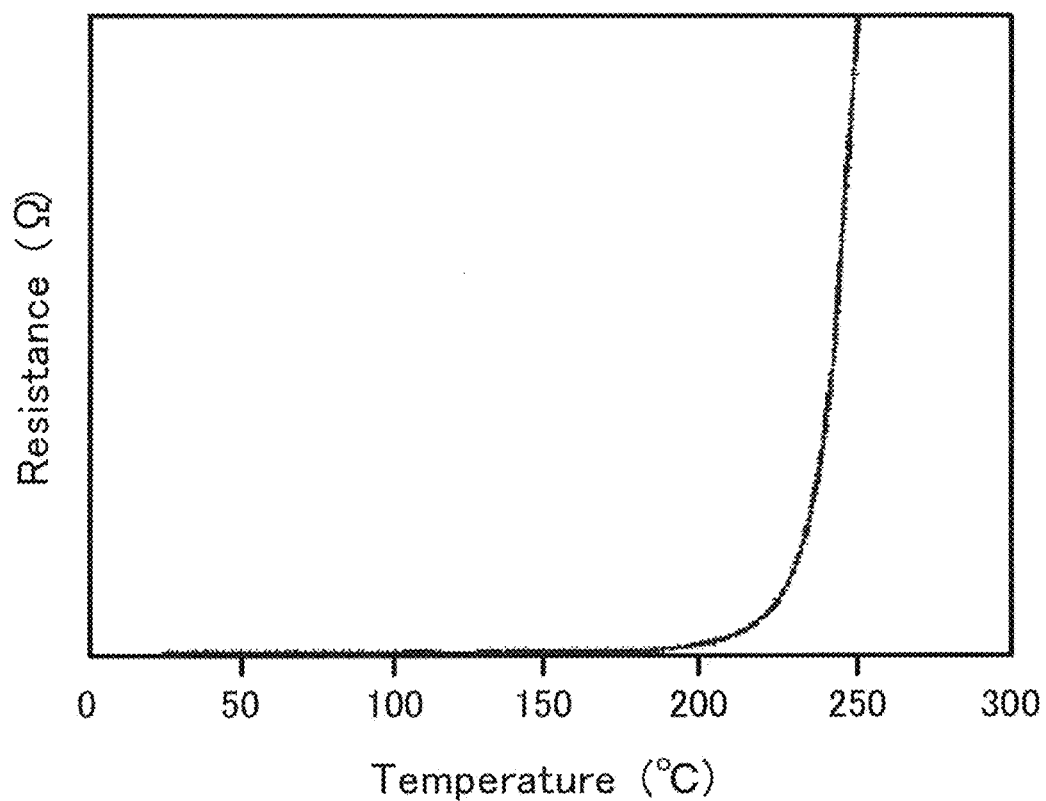
FIG. 6 is a graph showing a temperature dependency of an electrical resistance of an aluminum foil with a PPTC layer.
Figure 7:
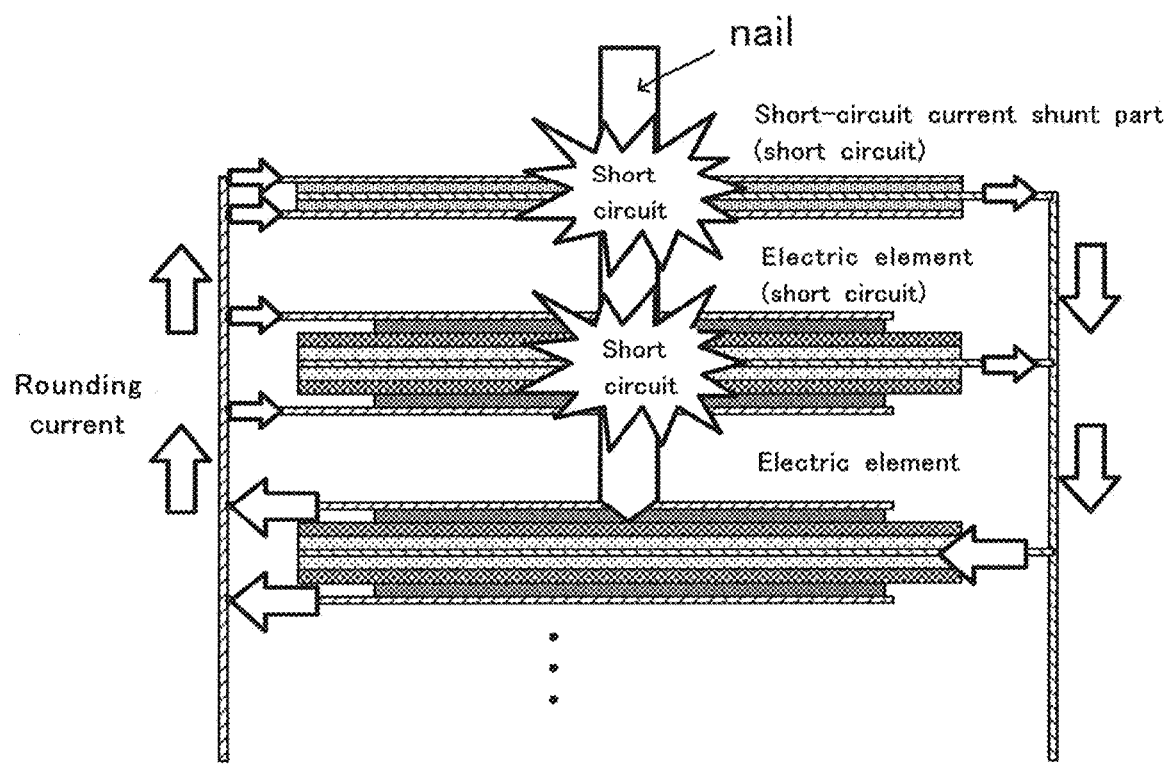
FIG. 7 is a schematic view to explain a rounding current in nailing that occurs when electric elements are connected in parallel.

The electrical resistance of the aluminum foil with PPTC layer was measured, whereby the temperature dependency of the aluminum foil with PPTC layer was checked. The results are shown in FIG. 6. As shown in FIG. 6, the resistance of the aluminum foil with PPTC layer rapidly increased in a non-linear fashion when its temperature reached a predetermined value or more. The increase amount of the resistance was 10 or more times larger than the resistance before the temperature reached the predetermined value. Using this aluminum foil with PPTC layer as the current collector layer of the short-circuit current shunt part may achieve a short-circuit current shunt part that can rapidly increase its resistance when its temperature reaches a predetermined value or more.

INDUSTRIAL APPLICABILITY

The stacked battery of the present application may be suitably used as a large on-board power source for vehicles, for example.

REFERENCE SIGNS LIST 10 short-circuit current shunt part
11 first current collector layer
11a first current collector tab
12 second current collector layer
12a second current collector tab
13 insulating layer
14 PPTC layer
20 electric element
21 cathode current collector layer
21a cathode current collector tab
22 cathode material layer
23 electrolyte layer
24 anode material layer
25 anode current collector layer
25a anode current collector tab
100 stacked battery

What is claimed is:

1. A stacked battery comprising:
at least one short-circuit current shunt part; and
a plurality of electric elements,
the short-circuit current shunt part and the electric elements being stacked,
wherein:
the short-circuit current shunt part comprises a first current collector layer, a second current collector layer, and an insulating layer provided between the first and second current collector layers, all of these layers being stacked;
each electric element comprises a cathode current collector layer, a cathode material layer, an electrolyte layer, an anode material layer, and an anode current collector layer, all of these layers being stacked;
the first current collector layer is electrically connected to the cathode current collector layer;
the second current collector layer is electrically connected to the anode current collector layer;
the electric elements are electrically connected to each other in parallel; and
the short-circuit current shunt part next to the electric elements comprises a polymer positive temperature coefficient (PPTC) layer between the first current collector layer and the insulating layer and/or between the second current collector layer and the insulating layer.

2. The stacked battery according to claim 1, wherein
the short-circuit current shunt part comprises a first short-circuit current shunt part close to the electric elements, and a second short-circuit current shunt part located on a side of the first short-circuit current shunt part opposite to the electric elements;
the first short-circuit current shunt part includes the PPTC layer; and
the second short-circuit current shunt part includes no PPTC layer.

3. The stacked battery according to claim 1, wherein
the cathode current collector layer, the cathode material layer, the electrolyte layer, the anode material layer, and the anode current collector layer in each electric element are stacked in a stacking direction,
the electric elements are stacked in the stacking direction,
the first current collector layer, the insulating layer, and the second current, collector layer in the short-circuit current shunt part are stacked in the stacking direction, and
the short-circuit current shunt part and the electric elements are stacked in the stacking direction.

4. The stacked battery according to claim 1, wherein the short-circuit current shunt part is provided at least outside the electric elements.

* * * * *